United States Patent
McCully et al.

(10) Patent No.: US 10,028,444 B2
(45) Date of Patent: Jul. 24, 2018

(54) GRAIN ELEVATOR FOR AN AGRICULTURAL COMBINE

(71) Applicant: CNH America LLC, New Holland, PA (US)

(72) Inventors: William Mark McCully, Lancaster, PA (US); Clayton E. Banks, Jr., Brownstown, PA (US); Eric Emerson Veikle, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 599 days.

(21) Appl. No.: 13/874,617

(22) Filed: May 1, 2013

(65) Prior Publication Data
US 2014/0329572 A1 Nov. 6, 2014

(51) Int. Cl.
*A01F 12/46* (2006.01)
*A01D 61/00* (2006.01)

(52) U.S. Cl.
CPC ............ *A01F 12/46* (2013.01); *A01D 61/008* (2013.01)

(58) Field of Classification Search
USPC ........... 474/92; 198/497, 499; 460/103, 114; 56/13.3, 14.6, 473.5
See application file for complete search history.

(56) References Cited

U.S. PATENT DOCUMENTS

| | | | | |
|---|---|---|---|---|
| 1,374,827 A | * | 4/1921 | Cruise | 56/32 |
| 2,513,706 A | * | 7/1950 | Baehr | 198/497 |
| 2,560,307 A | * | 7/1951 | Slemmons | 305/110 |
| 3,390,768 A | * | 7/1968 | Button | 209/665 |
| 3,580,257 A | | 5/1971 | Teague | |
| 3,605,295 A | * | 9/1971 | Walewski | 37/305 |
| 4,093,065 A | * | 6/1978 | Temme | 198/735.2 |
| 4,800,902 A | | 1/1989 | Maust | |
| 4,960,402 A | * | 10/1990 | Klein et al. | 474/80 |
| 5,725,292 A | * | 3/1998 | Keedy et al. | 305/110 |
| 6,012,241 A | * | 1/2000 | Pasienski et al. | 37/465 |
| 6,053,811 A | | 4/2000 | Johnson et al. | |
| 6,220,425 B1 | | 4/2001 | Knapp | |
| 6,350,197 B1 | | 2/2002 | Cooksey et al. | |
| 6,471,032 B2 | | 10/2002 | Busschaert et al. | |
| 6,527,347 B2 | * | 3/2003 | Brawley et al. | 301/110 |
| 6,945,023 B2 | | 9/2005 | Vandewalle et al. | |
| 7,011,580 B2 | | 3/2006 | Claeys et al. | |
| 7,584,836 B2 | * | 9/2009 | McCully et al. | 198/671 |
| 8,045,168 B2 | | 10/2011 | Missotten et al. | |

FOREIGN PATENT DOCUMENTS

JP 2013237556 A * 11/2013

* cited by examiner

*Primary Examiner* — Alicia Torres
(74) *Attorney, Agent, or Firm* — Patrick Sheldrake

(57) ABSTRACT

A combine harvester having a crop processing mechanism and an elevator assembly is provided. The elevator assembly conveys harvested crop to the crop processing mechanism. The elevator assembly includes an elevator housing, an endless conveyor mounted for rotation within the elevator housing about a shaft, and a sprocket stripper mounted adjacent the shaft. The sprocket stripper includes a beveled or tapered edge.

17 Claims, 7 Drawing Sheets

GRAIN ELEVATOR FOR AN AGRICULTURAL COMBINE

BACKGROUND OF THE INVENTION

The present invention relates generally to a grain conveyor for use with combine harvesters. In particular, the present invention relates to an improved grain elevator having a tapered or beveled sprocket stripper.

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material (i.e., the harvested crop) or generally referred to herein as "grain" then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG).

After passing through the threshing and separating assembly, the grain and MOG are deposited onto a grain cleaning system. The grain cleaning system of a typical combine includes a pair of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator (or elevator assembly) and deposited into a storage tank (or grain tank).

In typical combines, the elevator assembly inlet is partially blocked by a sprocket stripper. Owing to the presence of the sprocket stripper, the flow of grain into the elevator assembly is retarded, thereby negatively affecting the efficiency and throughput of the combine.

Thus, there is still a need for a grain conveyor for conveying clean grain that is capable of addressing the aforementioned drawbacks of conventional grain elevators. Such a need is satisfied by the grain elevator for a combine harvester of the present invention.

BRIEF SUMMARY OF THE INVENTION

In accordance with a preferred embodiment, the present invention provides a combine harvester that includes a crop processing mechanism and an elevator assembly. The elevator assembly conveys harvested crop to the crop processing mechanism. The elevator assembly including an elevator housing having an inlet, an endless conveyor mounted for rotation within the elevator housing about a shaft, and a sprocket stripper. The sprocket stripper is mounted adjacent the shaft and includes a first major surface extending substantially parallel to the shaft, and a second surface extending from the first major surface at a non-perpendicular angle relative to the first major surface.

In accordance with another preferred embodiment, the present invention provides a sprocket stripper for an elevator assembly of a combine harvester. The sprocket stripper includes a first major surface having an upper section, a lower section angled relative to the upper section, a first lateral side, and a second lateral side opposite the first lateral side. The sprocket stripper further includes a flange extending from the first lateral side, and a beveled edge extending along the second lateral side. The beveled edge has a grain engaging surface at an acute inside angle relative to the first major surface.

In accordance with yet another preferred embodiment, the present invention provides a combine harvester that includes an elevator assembly for conveying harvested crop to a crop processing mechanism. The elevator assembly includes a housing, an endless conveyor and a sprocket stripper. The housing has an inlet. The endless conveyor is mounted for rotation within the housing about a shaft. The sprocket stripper is mounted adjacent the inlet and includes a tapered edge having a grain engaging surface at a non-perpendicular angle relative to a longitudinal axis of the shaft.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings:

FIG. 5 partial cross-sectional left perspective view of a bottom portion of the elevator assembly of FIG. 2 without an auger attached thereto;

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain" and "crop material" are used throughout the specification for convenience and it should be understood that these terms are not intended to be limiting. Thus, "grain" refers to that part of a crop which is harvested and separated from discardable portions of the crop material.

Figure 1:
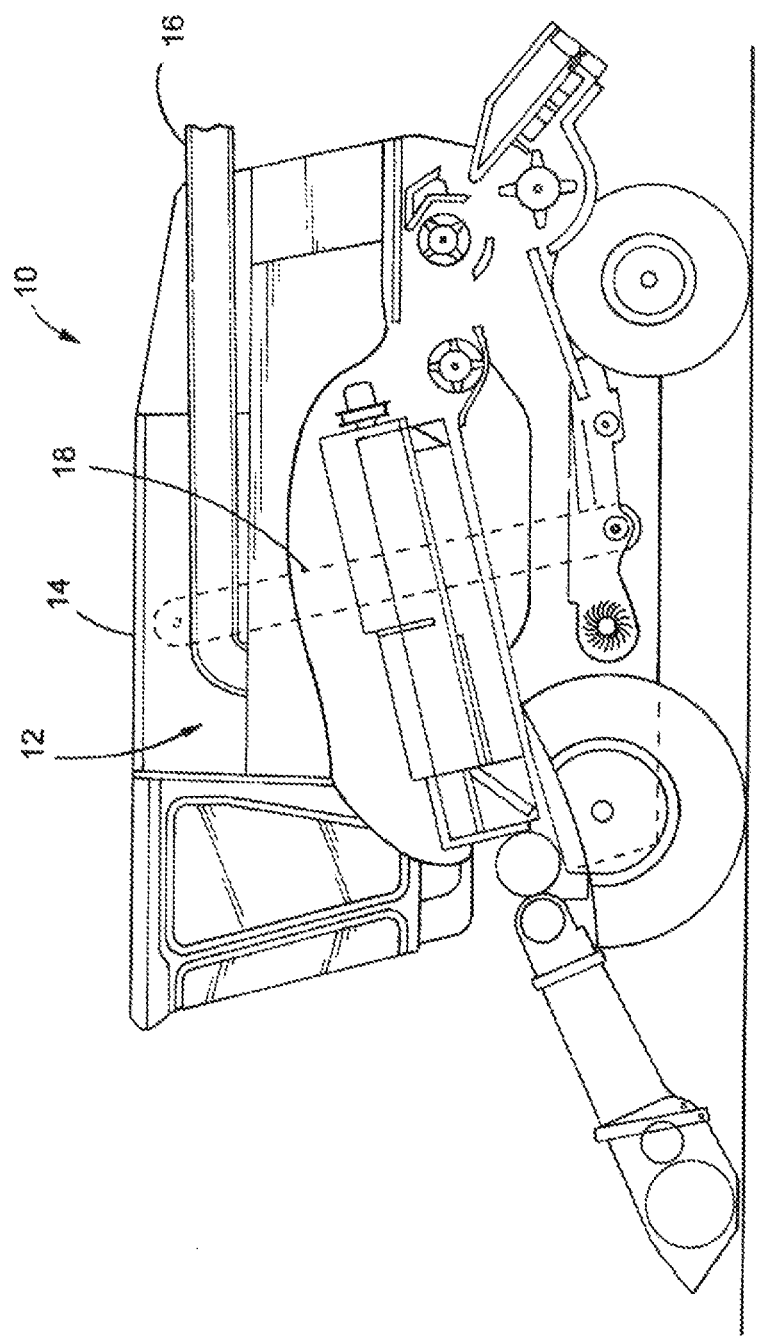
FIG. 1 is a simplified left side view of a combine harvester including an elevator assembly according to a preferred embodiment of the present invention.

In accordance with a preferred embodiment, the present invention provides a combine harvester 10, as shown in FIG. 1. The combine harvester 10 includes a crop processing mechanism 12 and an elevator assembly 18. The crop processing mechanism 12 can include e.g., a grain tank 14, a bubble up auger (not shown), and/or an unloader tube 16. As used herein, the term "crop processing mechanism" is used to refer to any mechanism on the combine harvester 10 that processes grain. The crop processing mechanism can be positioned upstream or downstream from the elevator assembly 18.

Figure 2:
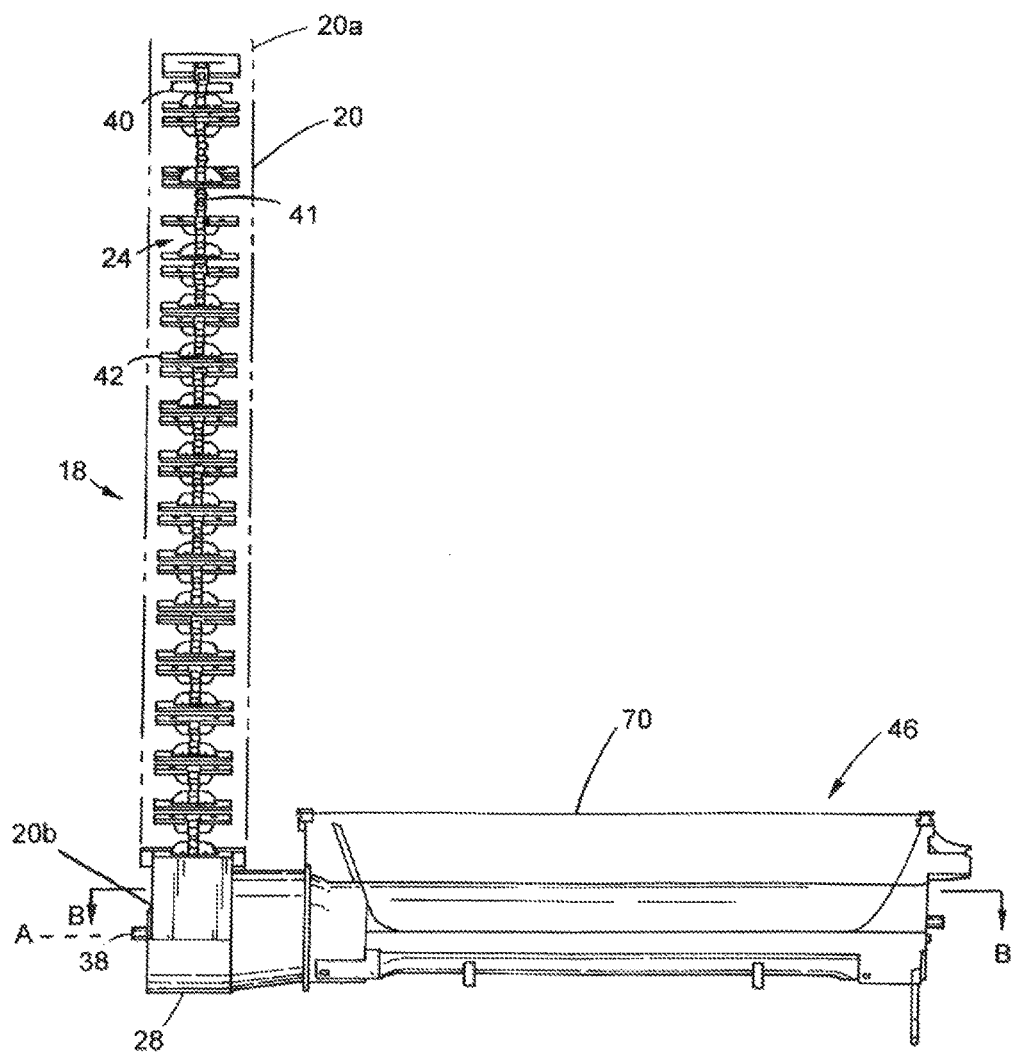
FIG. 2 is a front view of the elevator assembly of FIG. 1.

Referring to FIGS. 2 and 5, the elevator assembly 18, also referred to herein as a grain elevator, conveys grain or harvested crop material to a downstream crop processing mechanism e.g., the grain tank 14 or a bubble up auger (not shown). The elevator assembly 18 includes an elevator housing 20 having an inlet 22, an endless conveyor 24, and a sprocket stripper 26. The elevator housing 20 is an elongated housing having an upper end 20a and a lower end 20b. The lower end 20b includes a boot portion 28 that can be a separate component attached to the elevator housing 20 or integrally formed with the elevator housing 20.

As best shown in FIG. 5, the boot portion 28 of the elevator housing 20 includes a front wall 30, a rear wall 32 opposite the front wall 30, a bottom wall 34, a first side wall 36, and a second side wall 37 opposite the first side wall 36. The second side wall 37 is a planar wall forming the inlet 22. The bottom wall 34 is a concave wall having a semi-circular cross-section and preferably configured to have an access door (not shown).

Referring to FIGS. 2 and 5, the endless conveyor 24 is mounted for rotation within the elevator housing 20 about a shaft 38 at one end of the elevator housing 20 and another shaft 40 about an opposite end of the elevator housing 20. Each of the shafts 38, 40 include a sprocket mechanism for operatively engaging the endless conveyor 24. The endless conveyor 24 is preferably configured to include an endless chain 41 and a plurality of paddles 42 connected to the endless chain 41 for receiving and conveying grain. The endless chain 41 loops around the sprockets of the shafts 38, 40 about opposite ends of the elevator assembly 18. The shaft 40 is positioned near a top most end of the housing 20 while the shaft 38 is positioned near a bottom most end of the housing 20 or the boot portion 28 of the housing 20. The endless chain 41 rotates about axis A (FIG. 2) within the boot portion 28 of the housing 20. Axis A is concentric with a longitudinal axis of a shaft of an auger 44 of an auger assembly 46, as further discussed below.

Referring to FIG. 5 the paddles 42 of the elevator assembly 18 are configured to move in a downwardly direction about a first or return side (e.g., a front side) of the elevator housing 20 and in an upwardly direction about a second or grain conveyor side (e.g., rear side) of the elevator housing 20. In other words, a longitudinal axis of the shaft 38 extends perpendicular to the inlet 22 of the elevator housing 20.

The elevator housing 20 also includes a divider wall 48 that separates the return side from the grain conveyor side. The divider wall 48 extends almost the entire length of the elevator housing 20 with its terminal ends spaced apart from the respective shafts 38, 40. Further, as shown in FIG. 5, the sprocket stripper 26 connects to the housing 20 and acts as an extension of the divider wall 48 for extending further towards and adjacent the shaft 38. In other words, the sprocket stripper 26 is mounted within the elevator housing 20 so as to form an extension of the divider wall 48. When mounted, the sprocket stripper 26 is mounted or positioned adjacent the shaft 38.

Further details regarding the structure, function and operation of an endless conveyor and shaft assembly of an elevator assembly applicable to the present invention are disclosed in U.S. Pat. Nos. 8,045,168 and 6,350,197, the entire disclosures of which are hereby incorporated by reference herein.

The sprocket stripper 26 is preferably configured as best shown in FIGS. 4-12 and partially divides the elevator housing 20 between the return side and the grain conveyor side. Referring to FIGS. 7-12, the sprocket stripper 26 includes a first major surface 50 having a width sufficient to extend from the first side wall 36 to the second side wall 37 of the boot portion 28. While generally configured as a planar member, the first major surface 50 is preferably segmented between a first or upper section 50a and a second or lower section 50b that is angled or bent with respect to the upper section 50a. Of course, the lower section 50b can alternatively be configured without being angled or bent relative to the upper section 50a. The lower section 50b also includes notch 52 about its lower most end. As further discussed below, the first section 50a attaches to at least one wall of the elevator housing 20 and the second section 50b extends adjacent the inlet 22 in a chord-like manner.

The sprocket stripper 26 has a flange 54 extending from a first side or first lateral side of the first major surface 50. The flange 54 is also configured with one or more through holes 56 for receiving a fastener for attaching the sprocket stripper 26 to the elevator housing 20.

Figure 12:
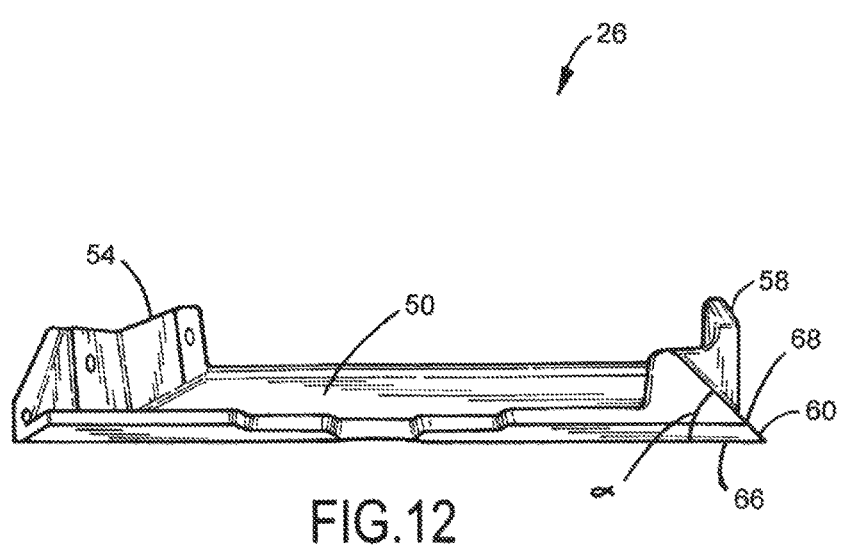
FIG. 12 is a bottom perspective view of the sprocket stripper of FIG. 7.

Opposite the first side is a second side or second lateral side of the first major surface 50. Preferably, a flange 58 extends from the second side about an upper region of the first major surface 50. The flange 58 also includes one or more through holes for receiving a fastener for attaching the sprocket stripper 26 to the elevator housing 20. The remaining length of the second side is configured with a beveled or tapered edge 60. The tapered edge 60 is configured to have its apex 62 pointing towards the right, as shown in FIG. 12, i.e., in a direction extending from the first side towards the second side of the sprocket stripper 26, or in a direction towards the inlet 22, as shown in FIG. 5. The tapered edge 60 includes a base 64 (FIG. 9) that extends substantially perpendicular to the first major surface 50 and more preferably substantially perpendicular to the second section 50b, a first major face 66 extending parallel to and along the same plane as the first major surface 50, and a second major face or second surface 68 extending from the base 64 at an angle α (FIG. 12) relative to the first major surface 50 or at an angle α relative to the first major face 66. The second surface 68 is a substantially planar surface extending from the first major surface 50 at a non-perpendicular angle relative to the first major surface 50. In other words, the second surface 68 is a grain engaging surface configured to have an acute inside angle α relative to the first major surface 50.

In sum, the second side of the first major surface 50 is preferably configured with a flange 58 and a tapered edge 60. However, the second side of the first major surface 50 can alternatively be configured without the flange 58 such that the entire length of the second side is a tapered edge, or with the second surface 68 extending from only the second section 50b of the sprocket stripper 26. Further, while the beveled or tapered edge 60 is preferably configured to have a longitudinal cross-section in the shape of a right triangle, the tapered edge 60 can alternatively be configured to have a longitudinal cross-section in the shape of an isosceles triangle, an equilateral triangle, a scalene triangle, or any other cross-sectional shape capable of forming a tapered geometry. In other words, the sprocket stripper 26 includes a tapered edge 60 having a grain engaging surface 68 at a non-perpendicular angle relative to a longitudinal axis of the shaft 38.

Figure 6:
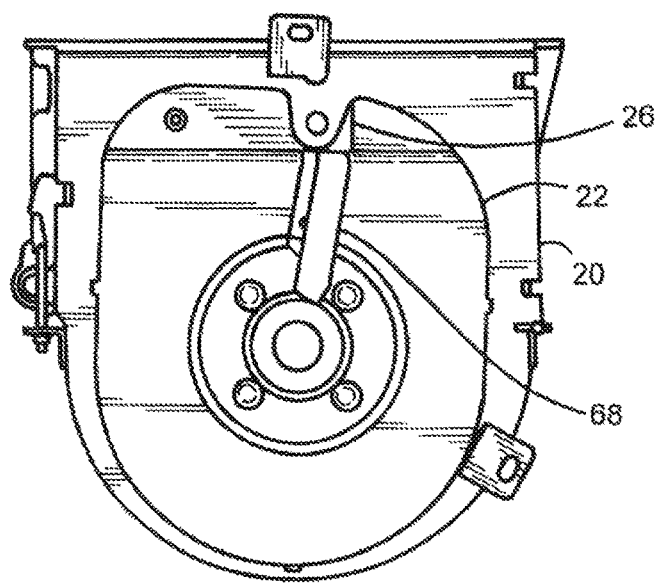
FIG. 6 is a left side elevation view of the boot portion of the elevator assembly of FIG. 2.
Figure 7:
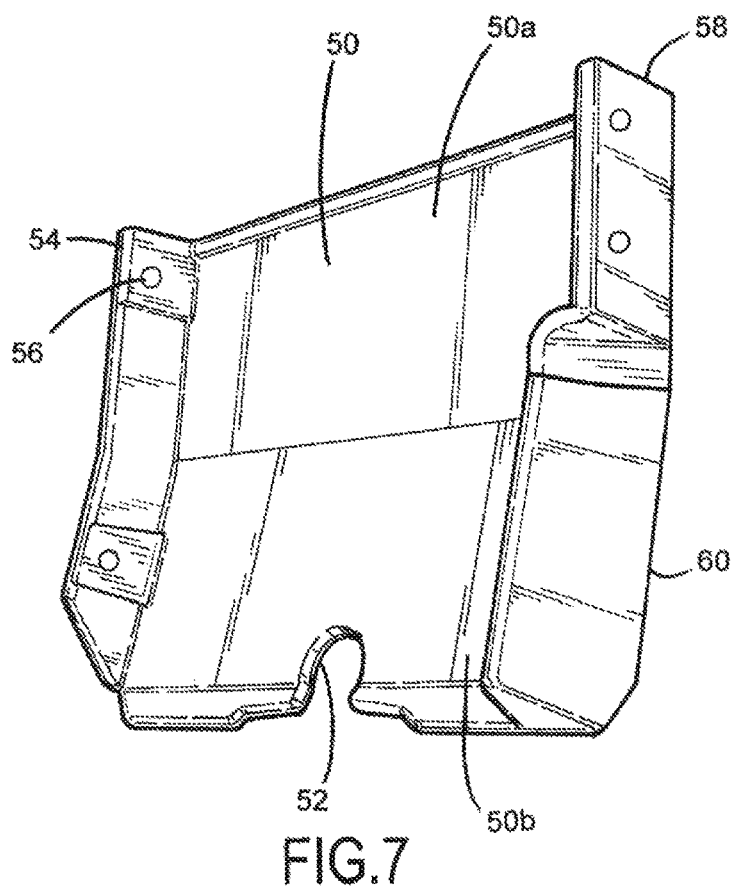
FIG. 7 is a front perspective view of a sprocket stripper of the elevator assembly of FIG. 2.
Figure 8:
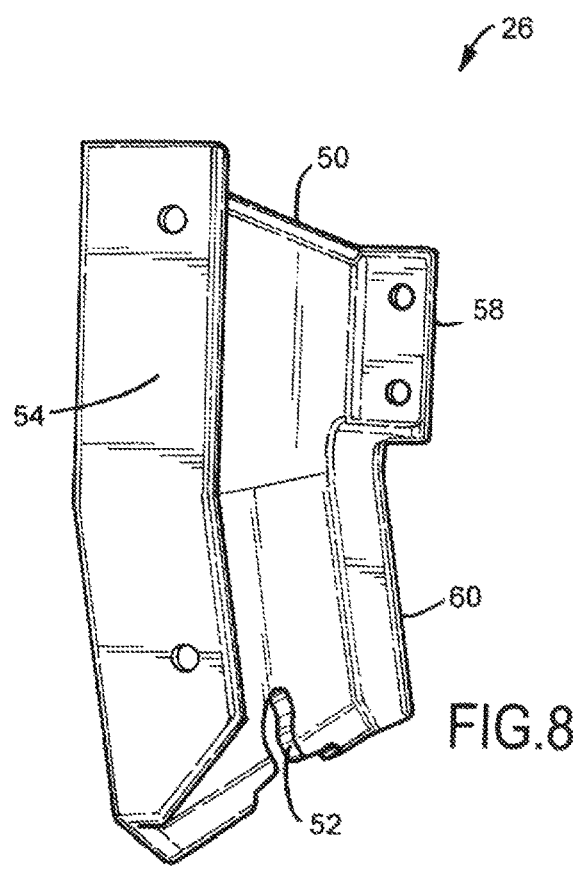
FIG. 8 is another front perspective view of the sprocket stripper of FIG. 7.
Figure 9:
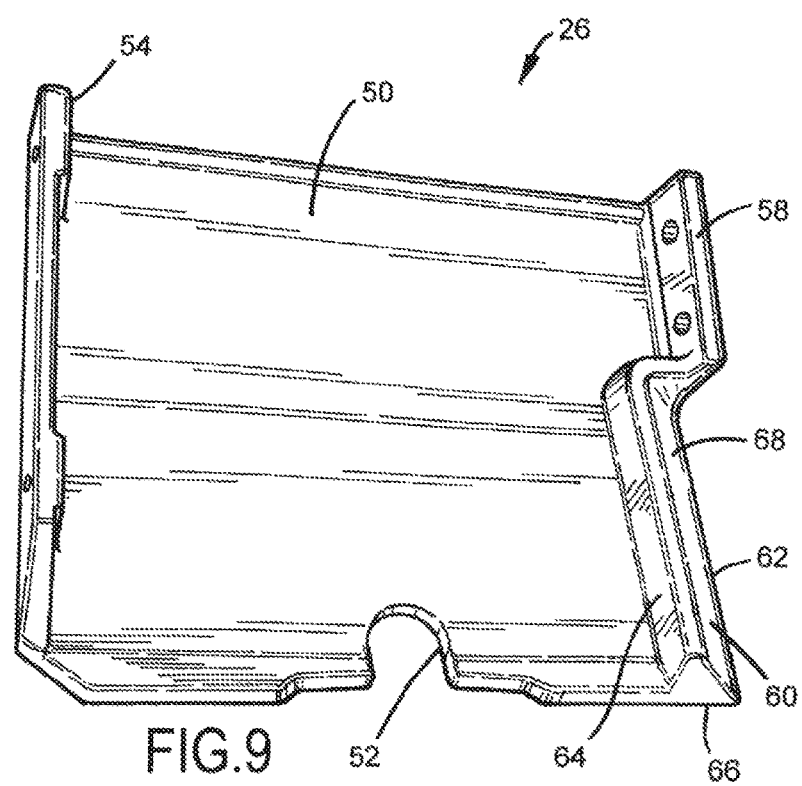
FIG. 9 is yet another front perspective view of the sprocket stripper of FIG. 7.
Figure 10:
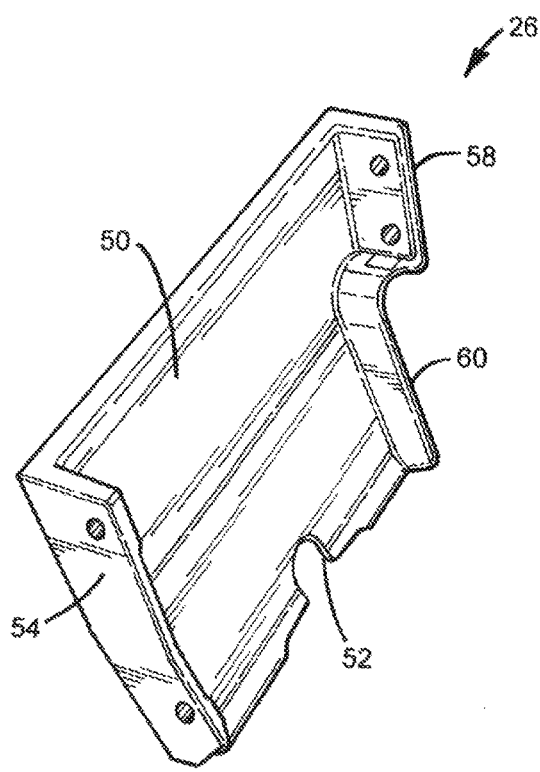
FIG. 10 is another front perspective view of the sprocket stripper of FIG. 7.
Figure 11:
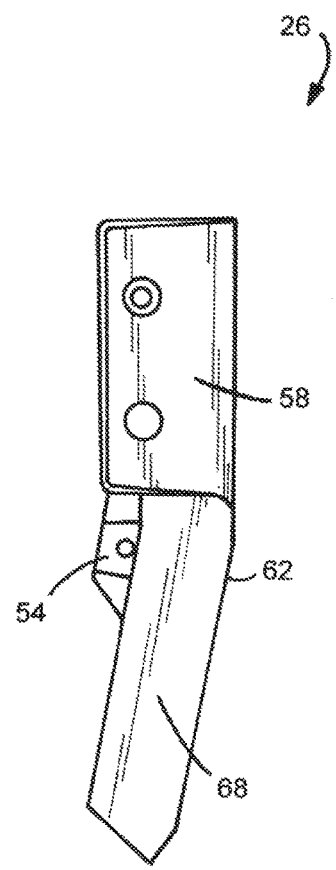
FIG. 11 is a left side elevation of the sprocket stripper of FIG. 7.

As best shown in FIG. 6, the upper section 50a of sprocket stripper 26 is attached to at least one wall of the elevator housing 20. Preferably, the flange 54 is attached to the first side wall 36 and the flange 58 is attached to the second side wall 37. The sprocket stripper 26 is also configured to attach to the elevator housing 20 such that the lower section 50b extends adjacent the inlet 22 in a chord-like manner. In other words, the tapered edge 60 of the sprocket stripper 26 is positioned within the elevator housing 20 adjacent the inlet 22 so as to extend adjacent the inlet area, as shown in FIG. 6, in a chord-like fashion. That is, the sprocket stripper 26 extends from the first side wall 36 to adjacent the inlet 22 and the second surface 68 is positioned within the elevator housing 20 adjacent the inlet 22.

Figure 3:
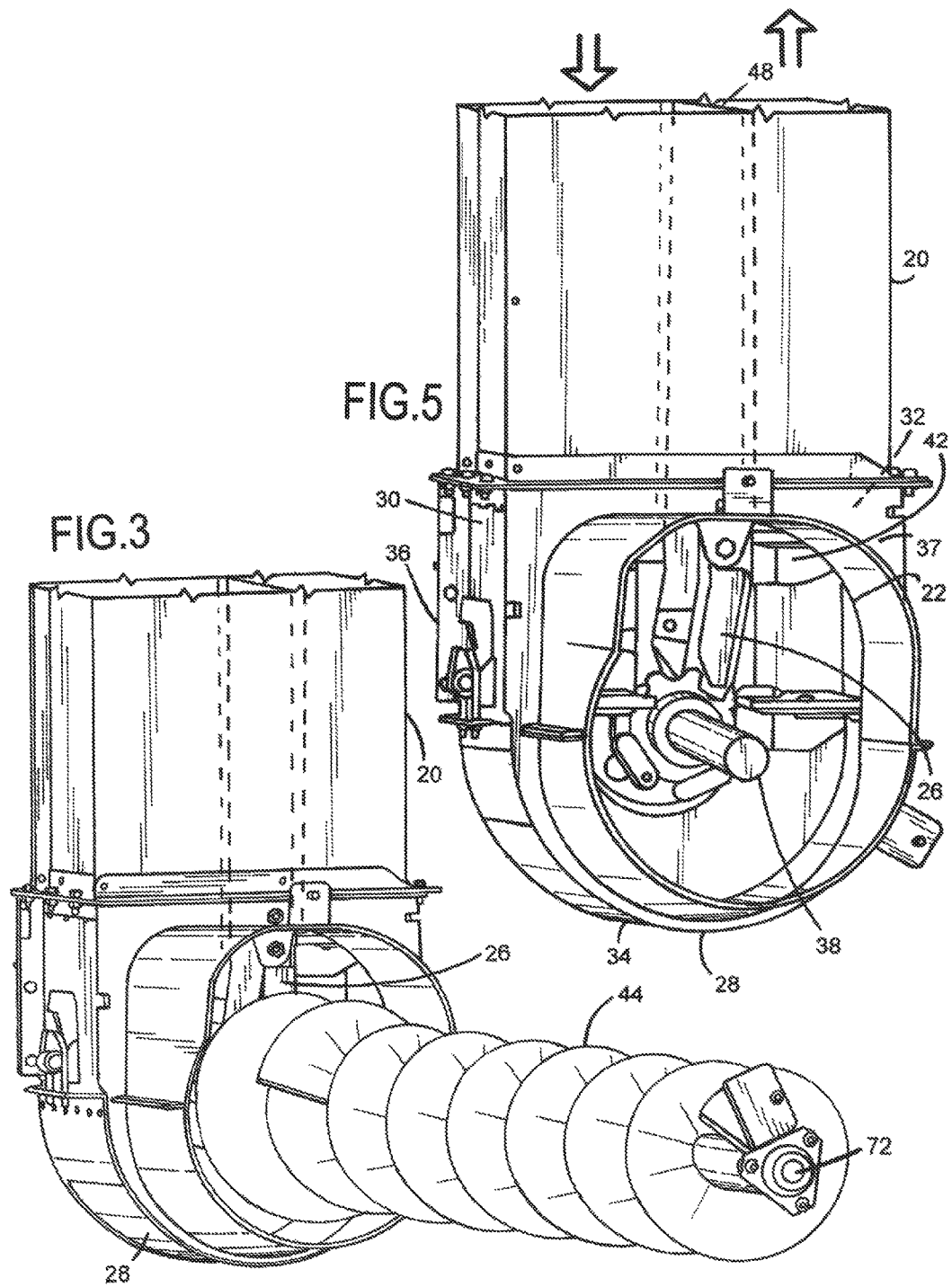
FIG. 3 is an enlarged partial perspective view of a bottom portion of the elevator assembly of FIG. 2 attached to an auger.
Figure 4:
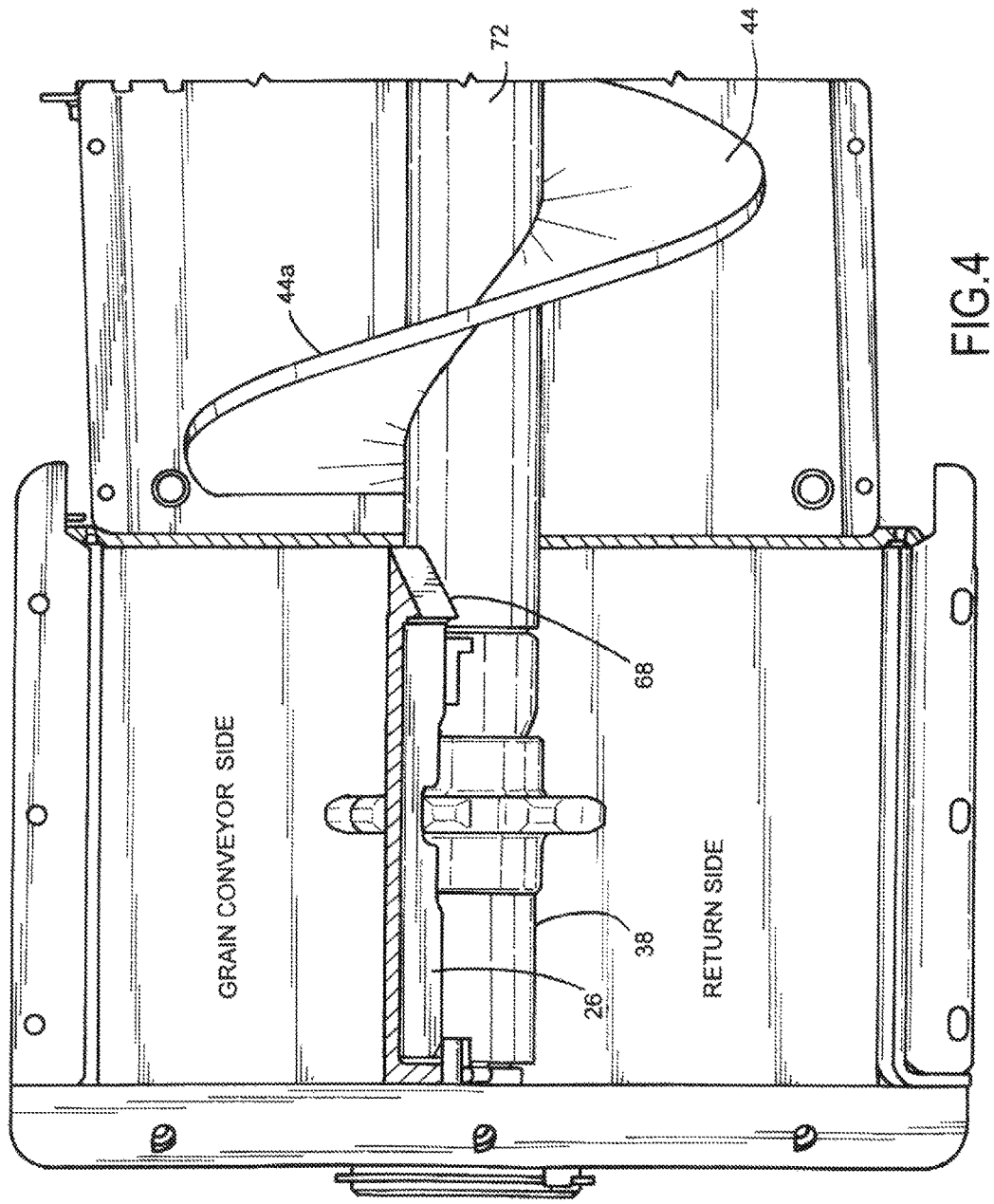
FIG. 4 is an enlarged partial cross-sectional plan view of the elevator assembly FIG. 2 taken along section B-B.

Referring to FIGS. 2-4, the elevator assembly 18 is connected to the auger assembly 46. The auger assembly 46 includes a trough 70 for receiving a flow of grain, and the auger 44. The auger 44 is connected to the shaft 38 and conveys grain from within the auger assembly trough 70 to the elevator assembly 18 via the inlet 22. The auger 44 includes an auger shaft 72 coaxial to and connected to the shaft 38 of the elevator assembly 18. The auger 44 can be a spiral auger, a dual diameter spiral auger, or a conveyor capable of conveying grain from the trough 70 to the elevator assembly 18.

Referring to FIG. 4, the sprocket stripper 26 is mounted within the housing 20 such that the first major surface 50 is substantially parallel to the shaft 38. In this arrangement, the second surface 68 of the sprocket stripper 26 is preferably configured to be angled substantially perpendicular to a normal face of a flight 44a of the auger 44. Further, the second surface 68 is configured to have an angle relative to a longitudinal axis of the shaft 38 so as to substantially direct a flow of harvested crop material received through the inlet 22 to the return side of the elevator housing 20.

In operation, as grain is conveyed from the auger assembly 46 to the elevator assembly 18, due to the geometry of the sprocket stripper 26, grain is more efficiently and effectively conveyed to within the elevator housing 20. That is, the sprocket stripper 26 of the instant invention advantageously provides a fluid dynamic surface and part geometry for receiving a flow of grain within the elevator housing 20 and directing the flow of grain to a return side of the elevator housing 20.

Referring back to FIG. 5, the elevator assembly 18 is configured with the paddles 42 moving downwardly or towards the inlet 22 about the front side (i.e., return side) of the housing 20, and the second surface 68 of sprocket stripper 26 directing the flow of grain into the elevator housing's front side. However, the elevator assembly can alternatively be configured to have the paddles 42 of the elevator assembly 18 moving downwardly or towards the inlet 22 about the rear side of the housing 18, in which case the second surface 68 of the sprocket stripper 26 would be configured at an angle to direct the flow of grain into the elevator housing's rear side.

It will be appreciated by those skilled in the art that changes could be made to the embodiments described above without departing from the broad inventive concept thereof. It is to be understood, therefore, that this invention is not limited to the particular embodiment disclosed, but it is intended to cover modifications within the spirit and scope of the present invention as defined by the appended claims.

We claim:

1. A combine harvester comprising:
   a crop processing mechanism; and
   an elevator assembly for conveying harvested crop to the crop processing mechanism, the elevator assembly including:
   an elevator housing having an inlet,
   an endless conveyor mounted for rotation within the elevator housing about a shaft, and
   a sprocket stripper mounted adjacent the shaft, the sprocket stripper including:
   a first major surface extending substantially parallel to the shaft toward an upper end of said elevator housing, and
   a second surface extending from the first major surface at a non-perpendicular angle relative to the first major surface; and
   wherein the stripper generally extends between an upper portion of the shaft and upper portion of the housing and the second surface extends from an end of the first surface bordering the inlet.

2. The combine harvester of claim 1, wherein the second surface is a substantially planar surface.

3. The combine harvester of claim 1, wherein the second surface is positioned within the elevator housing adjacent the inlet.

4. The combine harvester of claim 1, wherein shaft connects to an auger that conveys harvested crop to the elevator assembly, and wherein the second surface is angled substantially perpendicular to a normal face of a flight of the auger.

5. The combine harvester of claim 1, wherein the elevator housing includes a return side and a grain conveyor side, and wherein the second surface is angled to substantially direct a flow of harvested crop material received within the inlet to the return side.

6. The combine harvester of claim 1, wherein the elevator housing includes a front wall, a rear wall opposite the front wall, a first side wall, and a second side wall opposite the first side wall, wherein the second side wall forms the inlet and the sprocket stripper extends from the first side wall to adjacent the inlet.

7. The combine harvester of claim 1, wherein the sprocket stripper extends as a chord adjacent the inlet.

8. The combine harvester of claim 1, wherein the sprocket stripper includes a first section for attaching to at least one wall of the elevator housing and a second section that extends as a chord adjacent the inlet.

9. The combine harvester of claim 1, wherein the sprocket stripper partially divides the elevator housing between a return side and a grain conveyor side.

10. The combine harvester of claim 1, wherein the sprocket stripper is attached to a wall of the elevator housing.

11. The combine harvester of claim 1, wherein the second surface is configured to direct a flow of grain laterally relative to the shaft.

12. A combine harvester comprising:
a crop processing mechanism; and
an elevator assembly for conveying harvested crop to the crop processing mechanism, the elevator assembly including:
an elevator housing having an inlet,
an endless conveyor mounted for rotation within the elevator housing about a shaft, and
a sprocket stripper mounted adjacent the shaft, the sprocket stripper including:
a first major surface extending substantially parallel to the shaft toward an upper end of said elevator housing, and
a second surface extending from the first major surface at a non-perpendicular angle relative to the first major surface; and
the sprocket stripper includes a first section for attaching to at least one wall of the elevator housing and a second section that extends as a chord adjacent the inlet, wherein the second surface extends from only the second section of the sprocket stripper.

13. The combine harvester of claim 12, wherein the second surface is configured to direct a flow of grain laterally relative to the shaft.

14. A combine harvester comprising an elevator assembly for conveying harvested crop to a crop processing mechanism, the elevator assembly including:
a housing having an inlet;
an endless conveyor mounted for rotation within the housing about a shaft; and
a sprocket stripper mounted adjacent the inlet, wherein the sprocket stripper extends away from the shaft within the housing at least partially dividing the elevator housing between a return side and a grain conveyor side, the sprocket stripper including a tapered edge having a grain engaging surface at a non-perpendicular angle relative a longitudinal axis of the shaft, wherein the tapered edge extends from an end of the first surface bordering the inlet and an apex of the tapered edge faces the inlet.

15. The combine harvester of claim 14, wherein the tapered edge extends as a chord adjacent the inlet.

16. The combine harvester of claim 14, wherein the endless conveyor travels towards the inlet about the return side of the housing and away from the inlet about the grain conveyor side of the inlet, and wherein the grain engaging surface is configured to direct a flow of grain towards the return side.

17. The combine harvester of claim 14, wherein the grain engaging surface is configured to direct a flow of grain laterally relative to the shaft.

* * * * *